(12) United States Patent
Shafer et al.

(10) Patent No.: US 10,293,960 B2
(45) Date of Patent: May 21, 2019

(54) RIGIDIZING LATCH ASSEMBLY

(71) Applicant: Oceaneering International, Inc., Houston, TX (US)

(72) Inventors: Richard Eugene Shafer, Webster, TX (US); William Claude Robertson, Houston, TX (US)

(73) Assignee: Oceaneering International, Inc., Houston, TX (US)

( * ) Notice: Subject to any disclaimer, the term of this patent is extended or adjusted under 35 U.S.C. 154(b) by 327 days.

(21) Appl. No.: 15/251,075

(22) Filed: Aug. 30, 2016

(65) Prior Publication Data

US 2017/0058929 A1    Mar. 2, 2017

Related U.S. Application Data

(60) Provisional application No. 62/211,819, filed on Aug. 30, 2015.

(51) Int. Cl.
| | | |
|---|---|---|
| *B64G 4/00* | (2006.01) | |
| *F16B 5/06* | (2006.01) | |
| *F16B 2/12* | (2006.01) | |

(52) U.S. Cl.
CPC ............... *B64G 4/00* (2013.01); *F16B 2/12* (2013.01); *F16B 5/0642* (2013.01); *B64G 2004/005* (2013.01); *Y10T 29/49826* (2015.01); *Y10T 403/591* (2015.01); *Y10T 403/602* (2015.01); *Y10T 403/608* (2015.01); *Y10T 403/7067* (2015.01)

(58) Field of Classification Search
CPC ....... B64G 4/00; B64G 2004/005; F16B 2/04; F16B 2/14; F16B 2/18; F16B 2/185; F16B 7/042; F16B 7/0473; F16B 7/22; F16B 13/068; Y10T 29/49826; Y10T 403/591; Y10T 403/597; Y10T 403/599; Y10T 403/602; Y10T 403/608; Y10T 403/7015; Y10T 403/7056; Y10T 403/7067; Y10T 403/7069
USPC .... 403/322.1, 323, 325, 327, 330, 353, 370, 403/374.3, 374.4; 29/428
See application file for complete search history.

(56) References Cited

U.S. PATENT DOCUMENTS

| | | | | |
|---|---|---|---|---|
| 6,494,822 B1 * | 12/2002 | Hopkins | ............ | B23Q 3/15553 403/327 |
| 8,357,005 B2 * | 1/2013 | Hu | ............ | A45D 1/04 439/353 |
| 2016/0325928 A1 * | 11/2016 | Lepek | ............ | F16B 2/14 |

FOREIGN PATENT DOCUMENTS

GB             1027066 A  *  4/1966  ............ B25J 15/103

* cited by examiner

*Primary Examiner* — Josh Skroupa
(74) *Attorney, Agent, or Firm* — Maze IP Law, P.C.

(57) ABSTRACT

A rigidizing latch assembly comprises a robotically compatible aerospace attachment mechanism which comprises a male latch and a receptacle configured to cooperatively couple. The male latch comprises a male latch housing and a latch assembly movably disposed within the male latch housing; a driver operatively in communication with a latch support; a male latch core; a driver interface access port; and one or more extraction feet operatively in communication with the driver. The receptacle comprises a receptacle housing sized to receive a lower portion of the male latch housing; a positioning target adapted to provide a visual positioning targeting cue; and one or more latch interfaces dimensioned to releasably mate with a corresponding lead-in guide of the plurality of lead-in guides.

15 Claims, 4 Drawing Sheets

RIGIDIZING LATCH ASSEMBLY

RELATION TO OTHER APPLICATIONS

This application claims priority through U.S. Provisional Application 62/211,819, filed Aug. 30, 2015.

BACKGROUND

Often components need to have coupling male and female matched pairs. The invention described herein comprises a rigidizing latch assembly ("LAR") which, in embodiments, is a robotically compatible aerospace attachment mechanism designed to rigidly attach avionics boxes or any orbital replaceable unit to the structure of a vehicle or other structure.

However, its use is not limited to aerospace or to a male/female pair which must be robotically maneuvered.

DRAWINGS

Various figures are included herein which illustrate aspects of embodiments of the disclosed inventions.

DESCRIPTION OF EXEMPLARY EMBODIMENTS

Figure 1:
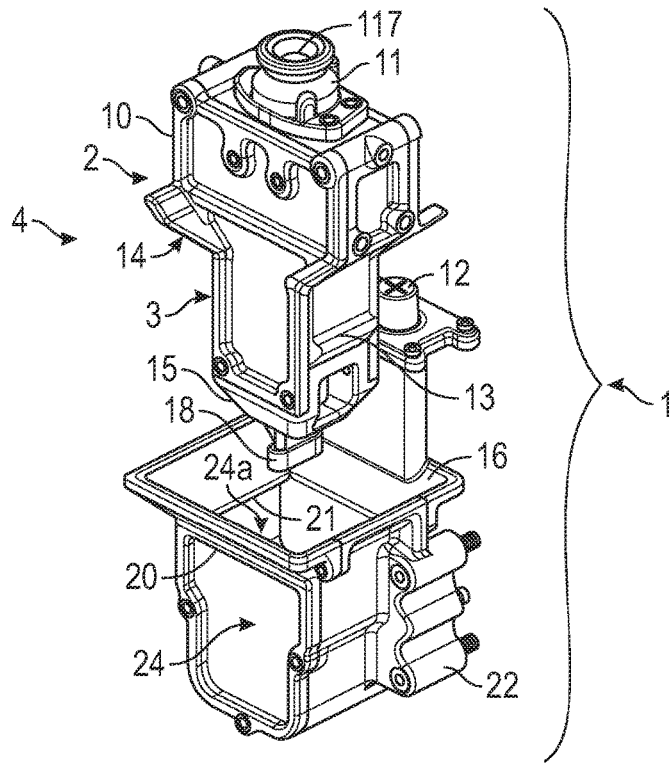
FIG. 1 is a view in partial perspective of an exemplary rigidizing latch assembly.

Referring generally to FIG. 1, in an embodiment rigidizing latch assembly 1 comprises male latch 10 and receptacle 20.

Figure 2:
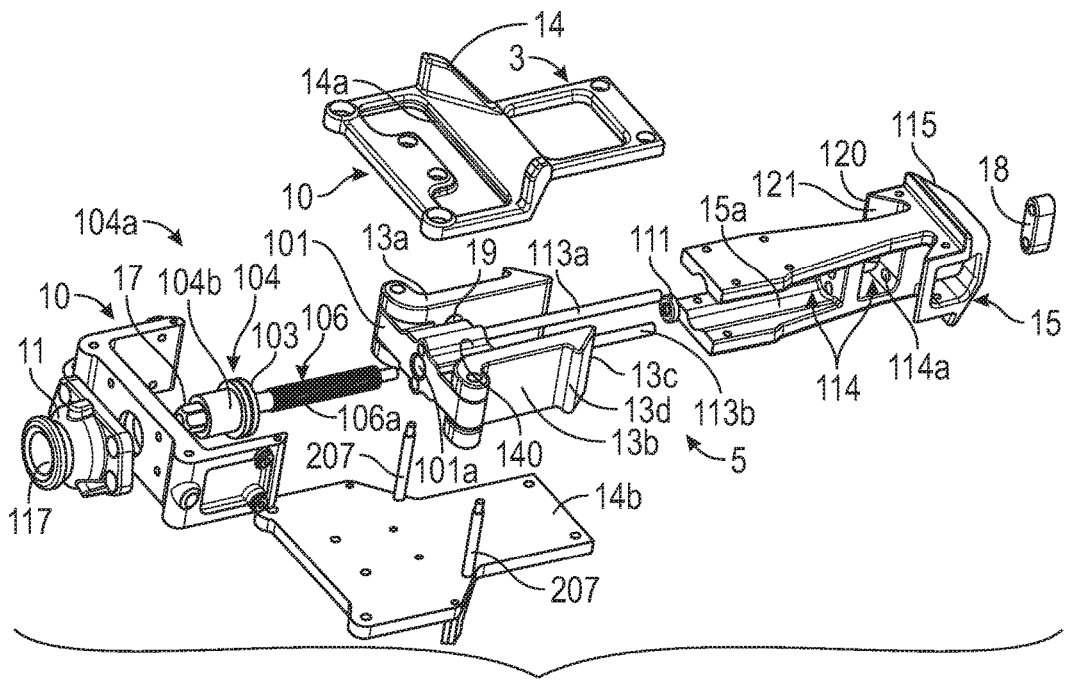
FIG. 2 is an exploded view in partial perspective of an exemplary male latch.

Referring additionally to FIG. 2, male latch 10 comprises male latch housing 4 (FIG. 1) and various components disposed within male latch housing 4, including: latch assembly 5 (FIG. 2) movably disposed within male latch housing 4; driver 106 (FIG. 2) operatively in communication with latch support 101 (FIG. 2); male latch core 15; and one or more extraction feet 18 operatively in communication with driver 106. Lower end 115 (FIG. 2) of male latch 10 may be sized to accept all or a portion of extraction foot 18 (FIG. 2) within lower end 115 of male latch 10. Typically, driver interface access port 117 allows access to driver 106 and/or driver interface from an exterior portion of male latch housing 4.

Male latch housing 4 typically comprises upper portion 2 (FIG. 1), lower portion 3 (FIG. 1), a plurality of lead-in guides 14 (FIG. 1), and grasp interface 11 (FIG. 1) disposed proximate upper portion 2.

Grasp interface 11 (FIG. 1) may be configured as a robot compatible grasp interface and may be integrated into male latch housing 4 (FIG. 1) or otherwise attached to male latch housing 4 such as using one or more connectors 105 (FIG. 3), e.g. bolts.

Latch assembly 5 (FIG. 2) comprises one or more latch supports 101 (FIG. 2) configured to move within male latch housing 4 (FIG. 1) where at least one latch support 101 comprises driver interface 101a (FIG. 2); one or more latches 13 (illustrated in FIG. 2 as 13a and 13b but referred to generally as 13) connected to latch support 101; and a set of tensioners 19 (FIG. 2) which correspond to a predetermined latch 13 and which are disposed intermediate latch support 101 and a corresponding latch 13a,13b of the plurality of latch 13.

Each latch 13 typically comprises angled lower portion 13c (FIG. 2) and mating portion 13d (FIG. 2).

Driver 106 (FIG. 2) typically comprises driver interface 17 (FIG. 2); latch support engager 106a (FIG. 2) adapted to movably engage with driver interface 101a (FIG. 2); and upper driver portion 104 (FIG. 2). Upper driver portion 104 may further comprise washer 103 (FIG. 2), bearing 104b (FIG. 2), a sleeve, or the like, or a combination thereof. In typical configurations latch support engager 106 comprises a threaded portion.

Male latch core 15 (FIG. 2) comprises inner annulus 114 and one or more latch receivers 120 (FIG. 2), where each latch receiver 120 typically comprises latch receiver interface 121 (FIG. 2) which is configured to complimentarily engage with lower portion 13c (FIG. 2) of a corresponding latch 13. Typically, lower portion 13c and latch receiver interface 121 are angled. In embodiments, pocket 114b may be formed in inner annulus 114 such as by removal of material to reduce weight and provide a hole for shaft 113 (FIG. 3) to pass through. As illustrated in FIG. 2, shaft 113 may comprise a plurality of shafts 113a,113b.

Receptacle 20 (FIG. 1) comprises receptacle housing 24 (FIG. 1) sized to receive lower portion 3 (FIG. 1) of male latch housing 4 (FIG. 1); positioning target 12 (FIG. 1) adapted to provide a visual positioning targeting cue; and one or more latch interfaces 21 (FIG. 1) dimensioned to releasably mate with a corresponding lead-in guide of the plurality of lead-in guides 14.

Receptacle housing 24 (FIG. 1) is typically hollow, and its interior void defines receptacle housing inner housing 24a (FIG. 1).

Positioning target 12 (FIG. 1) may be compatible with use by a robot positioning system.

Each latch interface 21 (FIG. 1) typically comprises a mating surface configured to cooperatively and securely engage mating portion 13d of a corresponding latch 13.

In embodiments, driver interface 101a (FIG. 2) comprises a thread and latch support engager 106a (FIG. 2) comprises a thread configured to cooperatively engage the thread of driver interface 101a.

One or more shafts 113 (FIG. 3; e.g. 113a and 113b in FIG. 2) may be present and are typically connected to extraction foot 18 (FIG. 2) and latch support 101 (FIG. 2) intermediate latch support 101 and extraction foot 18 such as at upper connection point 140 (FIG. 2) and lower connection point 114 (FIG. 3) of male latch core 15 (FIG. 2). Shafts 113 (FIG. 3) typically movably pass through one or more voids in male latch core 15 to access extraction foot 18.

In certain embodiments, driver 106 is allowed to pass by or alongside shafts 113 into male latch core 15 and may be terminated in or at terminator 111 (FIG. 2) which may be a washer, bearing, or the like.

Figure 3:
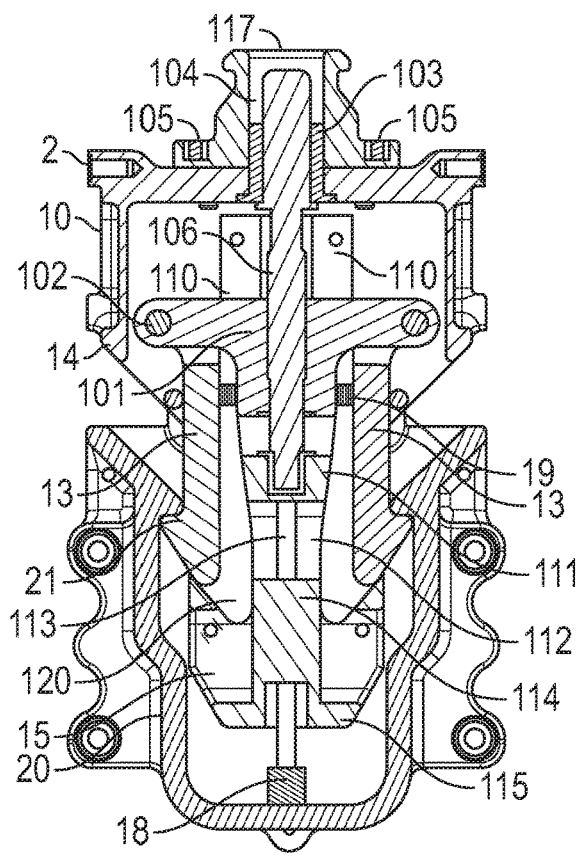
FIG. 3 is a cutaway view in partial perspective of an exemplary rigidizing latch assembly in a captured configuration.

In addition, latch support 101 may comprise a plurality of components, e.g. be bifurcated, and/or a plurality of latch supports 101 may be present within male latch housing 4 (FIG. 1). Each latch 13 is typically pivotally connected to an end portion of latch support 101 such as with pivot 102 (FIG. 3). Where there are a plurality of latches 13, each latch 13 is disposed on an opposing side of latch support 101.

Tensioner 19 (FIG. 2) typically comprises a spring.

Receptacle 20 (FIG. 1) may further comprise one or more structural mounting interfaces 22 (FIG. 1) integrated into or otherwise connected to receptacle housing 24 (FIG. 1).

Figure 6:
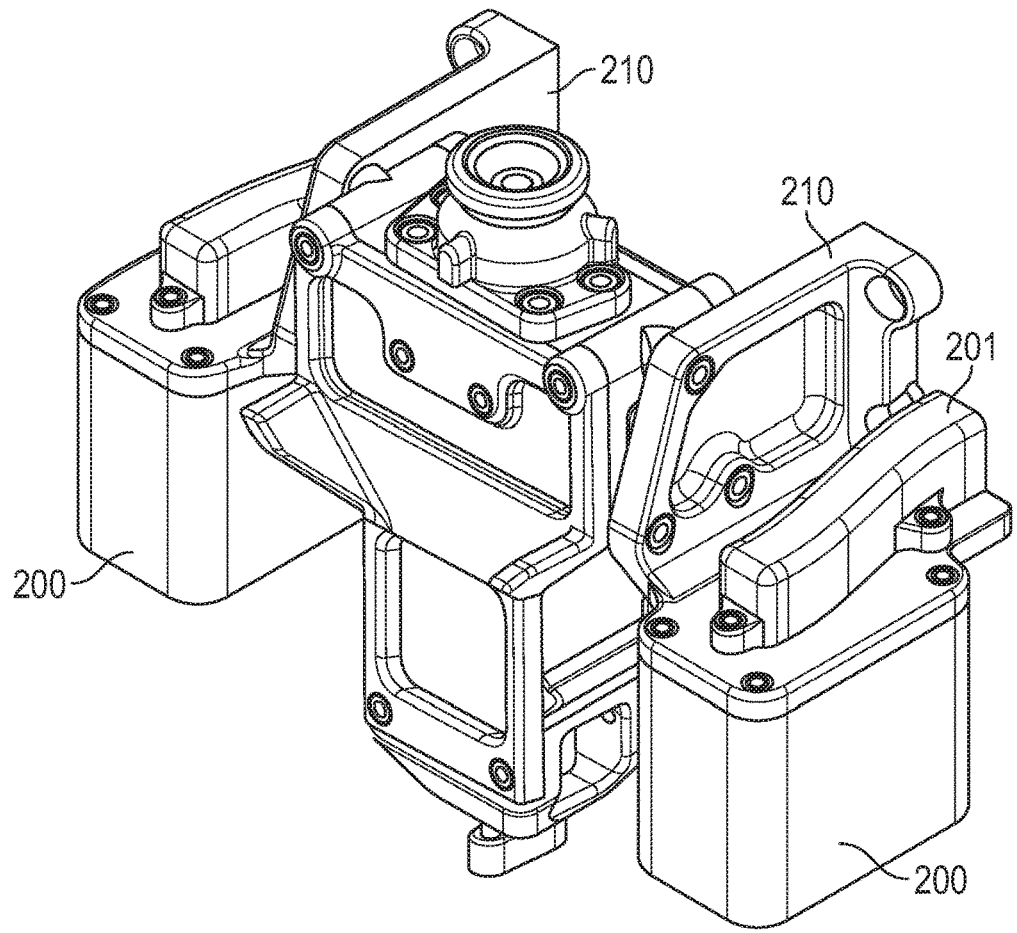
FIG. 6 is a view in partial perspective of an exemplary male latch assembly illustrating male connectors.

Referring now to FIG. 6, in certain embodiments one or more male connector housings 200 are present and integrated with or otherwise connected to male latch 10 (FIG. 1), e.g. to an exterior portion of male latch housing 4 (FIG. 1), and one or more corresponding female connector housings 300 (FIG. 7) integrated with or otherwise connected to female receptacle housing 20 (FIG. 1). Each female connector housing 300 is typically configured to cooperatively and removably receive a corresponding male connector housing 200. These male connector housing 200/female connector housings 300 may be configured to accept or otherwise provide access to connections such as electrical connections, optical connections, hydraulic connections, or the like, or a combination thereof, such as via access points 303 (FIG. 7).

Figure 7:
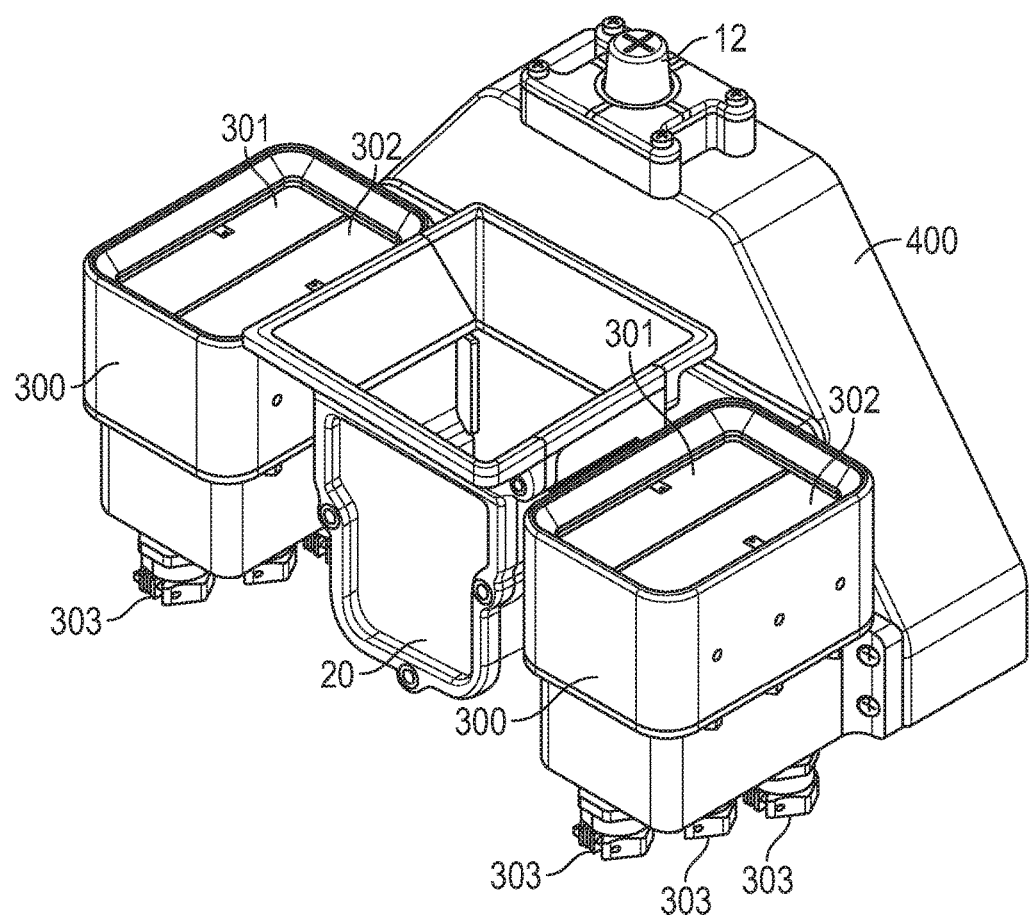
FIG. 7 is a view in partial perspective of an exemplary receiver illustrating female connectors.

Referring additionally to FIG. 7, in certain of these embodiments female connector housing 300 further comprises one or more movable flaps 301,302 urged into a closed position when its corresponding male connector housing 200 is not inserted into female connector housing 300 and urged into an open position when the corresponding male connector housing 200 is inserted into female connector housing 300. Each such movable flaps 301,302 may be configured such as to prevent or otherwise limit intrusion of debris or other unwarranted materials into female connector housing 300.

Additionally, bracket 400 (FIG. 7) may be integrated or otherwise connected to receptacle 20.

In the operational of exemplary embodiments, although in the discussion below a single latch 13 embodiment and a single latch support 101 embodiment are discussed, as one of ordinary skill in the mechanical arts will appreciate, these operations, or the like, may be used where latch 13 comprises a plurality of latches 13 and/or where latch support 101 comprises a plurality of latch supports 101.

Figure 4:
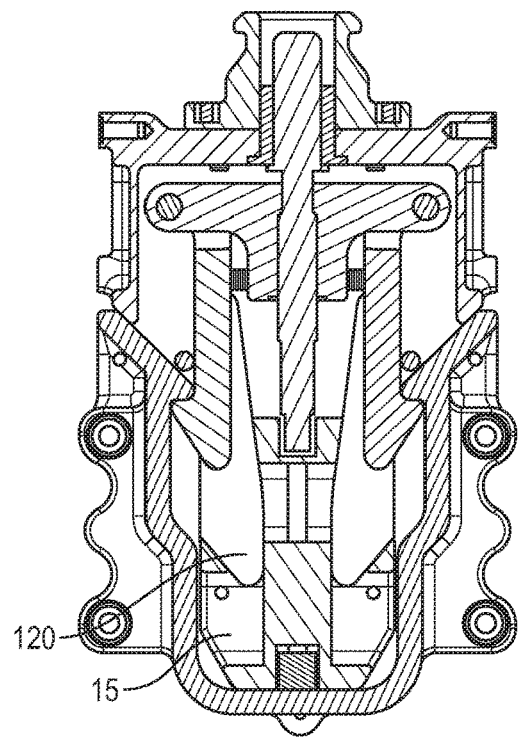
FIG. 4 is a cutaway view in partial perspective of an exemplary rigidizing latch assembly in a locked configuration.
Figure 5:
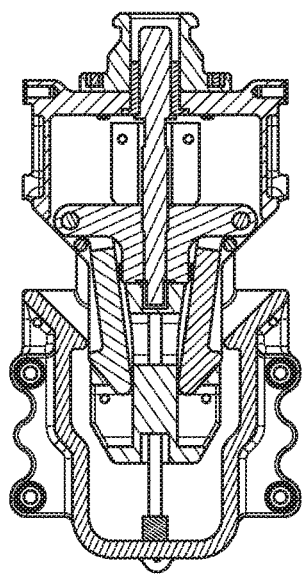
FIG. 5 is a cutaway view in partial perspective of an exemplary rigidizing latch assembly in a remove-ready configuration.

Generally, as illustrated in FIGS. 3-5, the operational sequence of rigidizing latch assembly 1 is capture (FIG. 3), lock (FIG. 4), and release (FIG. 4).

A rigidizing latch assembly as claimed above may be latched by capturing male latch 10 into receptacle 20. In an embodiment this may include rotating driver 106, which is engaged to threaded portion 101a of latch support 101, to move latch support 101 in a direction that places latch 13 into a withdrawn position. Typically, this includes moving latch support 101 until latch receiver 120 angled face 121 is engaged with a corresponding angled lower portion 13c of a corresponding latch such as latch 13b. Generally, latch 13b springs past its corresponding latch receiver 120 and latch receiver interface 121 and the geometry of latch 13, latch receiver 120, and latch receiver interface 121 prevents removal of male housing 10 once inserted into receptacle 20.

Once engaged to an acceptable position, male latch 10 is placed into its locked position by maneuvering male latch 10 with latch 13 in its withdrawn position proximate receptacle 20 and then maneuvering male latch 10 into a predetermined distance into receptacle 20 such as manually, by use of a tool, or the like, or a combination thereof.

Once at the predetermined distance into receptacle 20, driver 106 may be rotated or otherwise maneuvered to move latch support 101 in a direction that places latch 13b in an intermediate position between limits of travel of latch 13b. Typically, this involves rotating driver 106 which is engaged with threaded portion 101a of latch support 101. In a preferred embodiment, all latches 13 are spring-loaded outward and allowed to be pushed towards a centerline of male latch 10 until they contact receptacle inner housing 24a. Once engaged at the acceptable position, typically limited by the location of foot 18, male latch 10 may be locked into receptacle 20 by further inserting male latch 10 into receptacle 20 until mating portion 13d of latch 13b is inserted beyond its corresponding mating surface 21 of receptacle 20.

Once locked, driver 106 may be rotated or otherwise engaged until latch 13b is fully engaged against its corresponding latch interface 21.

In certain embodiments, advancing male latch 10 may be continued into receptacle 20 until lead-in guides 14 are in contact with guide receiver 16 to rigidize the assembly such that each angled face 121 of each latch receiver 120 is disengaged from its corresponding angled lower portion 13d of the corresponding latch 13b.

In certain embodiments, maneuvering male latch 10 a predetermined distance into the receptacle 20 may be controlled by using extraction foot 18.

Latch 13b may be released from receptacle 20 at a predetermined time by rotating or otherwise engaging driver 106 that engages each latch receiver 120 angled face 121 with its corresponding latch 13b angled lower portion 13c. This may be accomplished such as by rotating driver 106 in a predetermined direction. Once each latch receiver 120 angled face 121 with its corresponding latch 13b angled lower portion 12d is fully engaged, male latch housing 10 may be removed from receptacle 20.

In certain embodiments, extraction foot 18 may be extended beyond lower end 115 of male latch 10 as driver 106 is engaged during extraction and used to provide a separation force to disengage external attachment points and/or connectors such as power and data connections.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A rigidizing latch assembly, comprising:
 a. a male latch, comprising:
  i. a male latch housing, comprising:
   1. an upper portion;
   2. a lower portion;
   3. a plurality of lead-in guides; and
   4. a grasp interface disposed proximate the upper portion;
  ii. a latch assembly movably disposed within the male latch housing, the latch comprising:
   1. a latch support configured to move within the male latch housing, the latch support comprising a driver interface;
   2. a plurality of latches connected to the latch support, each latch comprising:
    a. an angled lower portion; and
    b. a mating portion;
   3. a plurality of tensioners disposed intermediate the latch support and a corresponding latch of the plurality of latches;

4. a driver operatively in communication with the latch support, the driver comprising:
   a. a driver interface;
   b. a latch support engager adapted to movably engage with the driver interface; and
   c. an upper driver portion; and
5. a male latch core, the male latch core comprising:
   a. an inner annulus; and
   b. a plurality of latch receivers, each latch receiver comprising an angled face configured to complimentarily engage with an angled lower portion of a corresponding latch;
6. an extraction foot operatively in communication with the driver; and
   iii. a driver interface access port configured to allow access to the driver interface from an exterior of the male latch housing; and
b. a receptacle, comprising:
   i. a receptacle housing sized to receive the lower portion of the male latch housing;
   ii. a positioning target adapted to provide a visual positioning targeting cue; and
   iii. a plurality of latch interfaces dimensioned to releasably mate with the plurality of lead-in guides, each latch interface comprising a mating surface configured to cooperatively and securely engage a mating portion of a corresponding latch.

2. The rigidizing latch assembly of claim 1, wherein:
a. the driver interface comprises a thread; and
b. the latch support engager comprises a thread configured to cooperatively engage the driver interface thread.

3. The rigidizing latch assembly of claim 1, further comprising a shaft connected to the extraction foot and the latch support intermediate the latch support and the extraction foot.

4. The rigidizing latch assembly of claim 1, wherein the tensioner comprises a spring.

5. The rigidizing latch assembly of claim 1, wherein the receptacle further comprises a structural mounting interface connected to the receptacle housing.

6. The rigidizing latch assembly of claim 1, wherein the plurality of latches are disposed on opposing sides of the latch support.

7. The rigidizing latch assembly of claim 1, wherein the positioning target comprises a robot compatible positioning target.

8. The rigidizing latch assembly of claim 1, further comprising:
a. a male connector housing connected to the male latch; and
b. a female connector housing connected to the receptacle housing, the female connector housing configured to cooperatively and removably receive the male connector housing.

9. The rigidizing latch assembly of claim 8, wherein the female connector housing further comprises a movable flap urged into a closed position when the male connector housing is not inserted into the female connector housing and urged into an open position when the male connector housing is inserted into the female connector housing.

10. The rigidizing latch assembly of claim 9, wherein the movable flap comprises a plurality of movable flaps.

11. The rigidizing latch assembly of claim 4, further comprising a bracket connected to the receptacle.

12. A method of latching a rigidizing latch assembly, the rigidizing latch assembly comprising a male latch, the male latch comprising a male latch housing, comprising an upper portion, a lower portion, a plurality of lead-in guides, and a grasp interface disposed proximate the upper portion; a latch assembly movably disposed within the male latch housing, the latch comprising a latch support configured to move within the male latch housing, the latch support comprising a driver interface; a plurality of latches connected to the latch support, each latch comprising an angled lower portion and a mating portion; a plurality of tensioners disposed intermediate the latch support and a corresponding latch of the plurality of latches; a driver operatively in communication with the latch support, the driver comprising a driver interface, a latch support engager adapted to movably engage with the driver interface, and an upper driver portion, and a male latch core, the male latch core comprising an inner annulus, and a plurality of latch receivers, each latch receiver comprising an angled face configured to complimentarily engage with an angled lower portion of a corresponding latch; an extraction foot operatively in communication with the driver, and a driver interface access port configured to allow access to the driver interface from an exterior of the male latch housing, and a receptacle, comprising a receptacle housing sized to receive the lower portion of the male latch housing, a positioning target adapted to provide a visual positioning targeting cue, and a plurality of latch interfaces dimensioned to releasably mate with the plurality of lead-in guides, each latch interface comprising a mating surface configured to cooperatively and securely engage a mating portion of a corresponding latch, the method comprising:
a. capturing the male latch into the receptacle by:
   i. rotating the driver which is engaged to the threaded portion of the latch support to move the latch support in a direction that places the latches into withdrawn position by engaging the latch receiver angled face with a corresponding angled lower portion of a corresponding latch;
   ii. maneuvering the male latch with the plurality of latches in their withdrawn position proximate the receptacle;
   iii. maneuvering the male latch a predetermined distance into the receptacle;
   iv. rotating the driver which is engaged to the threaded portion of the latch support to move the latch support in a direction that places the latches in an intermediate position between limits of travel of the latches, the latches being spring-loaded outward and allowed to be pushed towards a centerline of the male latch until they contact the inner housing;
b. once captured, locking the male latch in the receptacle by further inserting the male latch into the receptacle until the mating portion of a corresponding latch is inserted beyond its corresponding latch interface mating surface;
c. once locked, rotating the driver until the latches are fully engaged against the latch interfaces; and
d. continuing to advance the male latch into the receptacle until the lead-in guides are in contact to rigidize the assembly where each latch receiver angled face is disengaged from its corresponding latch angled lower portion.

13. The method of latching a rigidizing latch assembly of claim 12, further comprising releasing the latch from the receptacle at a predetermined time by:
a. rotating the driver in a direction that engages each latch receiver angled face with its corresponding latch angled lower portion; and b. once fully engaged, removing the male male latch housing from the receptacle.

14. The method of latching a rigidizing latch assembly of claim 12, further comprising:
   a. extending the extraction foot beyond a lower end of the male latch as the driver is rotated during extraction; and
   b. using the extraction foot to provide a separation force to disengage external attachment points and/or connectors such as power and data connections.

15. The method of latching a rigidizing latch assembly of claim 12, further comprising controlling the maneuvering the male latch a predetermined distance into the receptacle by using the extraction foot.

* * * * *